United States Patent [19]
Bennett

[11] Patent Number: 4,571,590
[45] Date of Patent: Feb. 18, 1986

[54] SYSTEM FOR ADAPTIVELY ADJUSTING RADAR RECEIVER ATTENUATION

[75] Inventor: R. James Bennett, Prince Georges, Md.

[73] Assignee: Westinghouse Electric Corp., Pittsburgh, Pa.

[21] Appl. No.: 513,210

[22] Filed: Jul. 13, 1983

[51] Int. Cl.⁴ .............................................. G01S 13/00
[52] U.S. Cl. ................................. 343/7 AG; 343/7 A
[58] Field of Search ............ 343/7 AG, 7 A; 330/278

[56] References Cited

U.S. PATENT DOCUMENTS 3,786,506  1/1974  Effinger et al. ............. 343/7 AG X
4,058,809  11/1977 Chudleigh, Jr. ...................... 343/7 A
4,263,560  4/1981  Ricker ........................ 343/7 AG X
4,509,050  4/1985  Amoroso, Jr. et al. ......... 343/7 A X Primary Examiner—Thomas H. Tarcza
Assistant Examiner—Mark Hellner
Attorney, Agent, or Firm—W. E. Zitelli

[57] ABSTRACT

A system for adaptively adjusting a radar's receiver attenuation of input signals having a wide dynamic range to maintain the attenuated signals within a predetermined range for radar post processing operations is disclosed. The system includes an automatic gain control (AGC) loop governed by a computed logarithmic signal representative of the measured clutter content of the input signals received over the time interval of a radar look and a compatible reference logarithmic signal to generate a logarithmic adjustment signal for the receiver attenuation. The AGC loop includes selectable loop gains which are selected as a function of the computed logarithmic signal. More specifically, one set of loop gains is selected when the computed logarithmic signal is equal to or greater than a threshold level, and another set of loop gains is selected when the computed logarithmic signal is less than the threshold level. The AGC loop may further include an accumulator for accumulating signals based on the logarithmic signals computed over a succession of radar looks, and apparatus for rendering the AGC loop unresponsive to the computed logarithmic signals for a period of time and for causing the accumulator to converge to a desired level during the time period. The AGC loop may further include a limiter for limiting the logarithmic adjustment signal to within a predetermined signal range.

6 Claims, 9 Drawing Figures

BACKGROUND

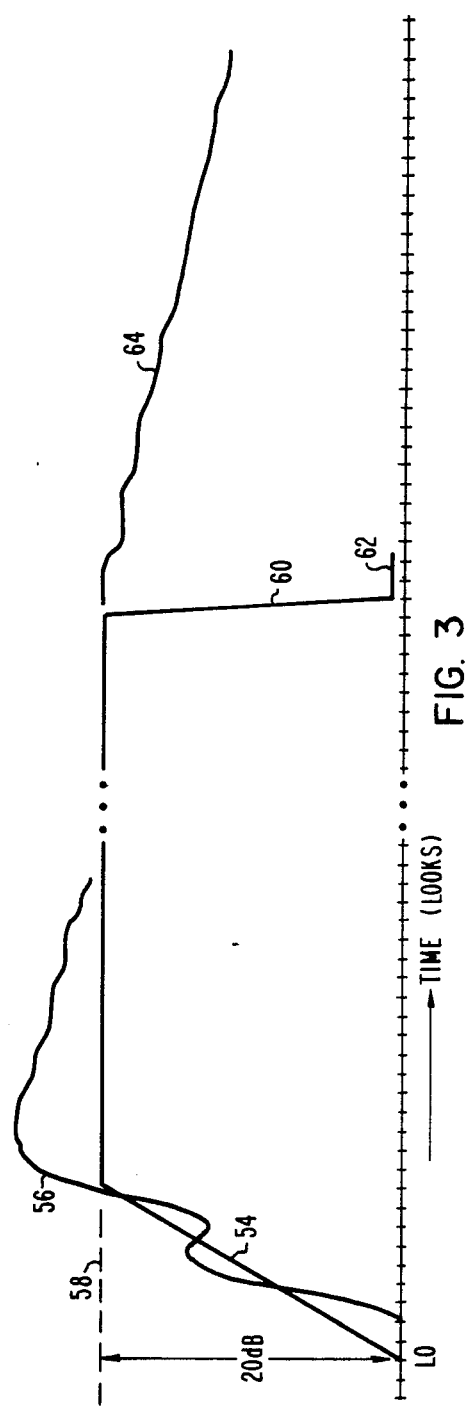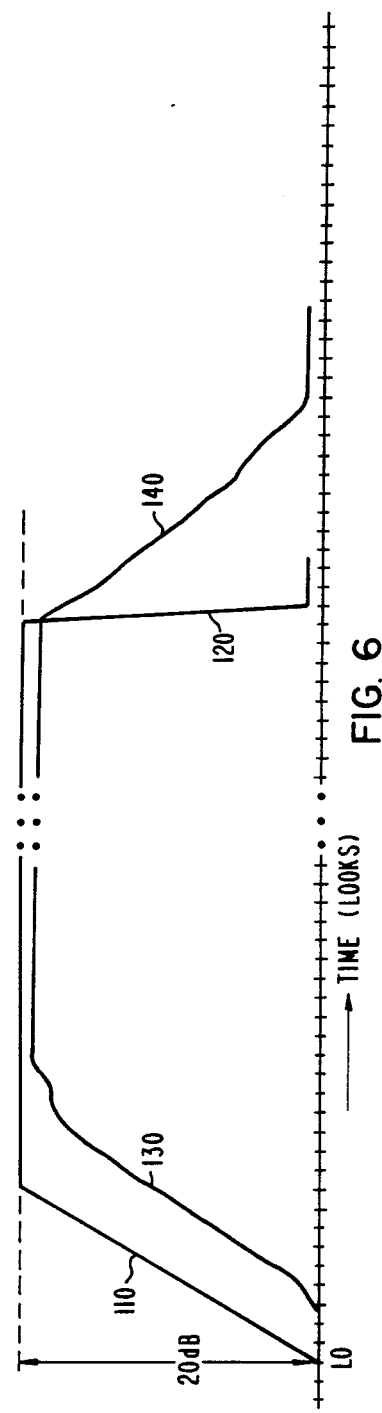

SYSTEM FOR ADAPTIVELY ADJUSTING RADAR RECEIVER ATTENUATION

GOVERNMENT RIGHTS CLAUSE

The Government has rights to this invention pursuant to Contract No. F09603-79-G-1112 awarded by the Department of the Air Force.

BACKGROUND OF THE INVENTION

The invention relates generally to radar receiver attenuation, and more particularly to a system for adaptively adjusting the radar receiver attenuation of input signals having a wide dynamic range to maintain the attenuated signals within a predetermined range for radar post processing operations.

In general, radar systems deal with input signals that have a wide dynamic range. These signals are normally scaled with one or more attenuators in the radar receiver so that post processing in a digital signal processor, for example, may be accomplished with signals within a predetermined desired range. The receiver attenuation may be dynamically adjusted to the input signaling by means of an automatic gain control, AGC, loop to maintain the attenuated signals within the desired range of the digital signal processor. A desirable AGC loop design attempts to minimize the responsiveness of the radar receiver to rapidly changing input signal strength which may cause either saturation or, so much attenuation, that a target may go undetected (i.e., radar blind time). However, along the same lines, the AGC loop should not be designed to respond to rapid fluctuations of noisy input signals.

A typical radar receiver including an AGC loop may be embodied similar to that shown by the functional block diagram of FIG. 1. Referring to FIG. 1, the radar receiver 10 may include an RF stage 12 and one or more IF stages 14 yielding a video signal 16 which may have a frequency spectrum surrounding a frequency at or near baseband level. Each IF stage 14 may include a conventional combination of a mixer 18 and a filtering-/conditioning amplifier 20. The mixer 18 is generally used to beat the frequency of the RF signals down to a lower level utilizing a reference frequency signal 22 to generate a signal 24 which is then filtered and conditioned by the conventional circuit 20. The radar receiver 10 generally includes conventional receiver attenuation for attenuating the input signaling flowing therethrough. This receiver attenuation may be found in either the RF stage 12, IF stages 14 or a combination thereof and is normally calibrated logarithmically, like in units of decibels, for example. The receiver attenuation may be governed by one or more AGC signals 26.

In most modern radars, the video signal 16 may be digitized by a high speed analog-to-digital (A/D) converter 28 with the resulting signals provided to a post processor 30 which may be a digital signal processor, for example. In addition, the digitized attenuated input signals may be provided to a clutter analyzer 32 which derives a signal representative of the clutter content of the input signals receiver over the time interval of a radar look. The derived signals 34 may be provided to a conventional radar computer 36 which may be programmed to perform the functions of the AGC loop which generates the signaling 26.

A typical operation of the AGC loop embodiment of FIG. 1 may be described in connection with the exemplary waveforms 2A–2C of FIG. 2. Referring to FIG. 2, during an initial radar loop L0 from time t0 to t1, the receiver 10 is attenuating the received input signals 11 with an initial receiver attenuation and providing the attenuated signals via A/D converter 28 to the clutter analyzer 32. The clutter content is derived in the clutter analyzer 32 during a time interval 40, for example, as shown in the waveform 2B subsequent to the time t1. The derived signal is thereafter provided to the radar computer 36 which generates therefrom the adjustment signal 26 for the receiver attenuation. The receiver attenuation may be readjusted by the newly derived adjustment signal 26 during the look L2 as designated by the update pulse 42 at time t2. The time periods for the looks of the radars are designated by $\tau$. Thus, in the present example, there exists a $2\tau$ delay in the adjustment of the receiver attenuation with regard to the corresponding input signaling used to derive the adjustment signal 26 of time interval 40. The above process may be continued similarly for subsequent looks L1, L2, L3, . . . wherein the input signaling is collected during the corresponding radar look resulting in a delayed derivation of the respective adjustment signal 26 by one radar look in each case as designated by the time intervals 44, 46, . . . in waveform 2B. Likewise, the radar computer 36 provides the derived adjustment signals to adjust the receiver attenuation respectively at time intervals designated by 48, 50, . . . in waveform 2C.

One drawback of the present AGC loop is that the derivation of the clutter measurement of a radar look in the clutter analyzer 32 is not compatible with the logarithmic calibration of the receiver attenuation. That is, the clutter measurement signal is non-linear with respect to the receiver attenuation calibration, and vice versa. For example, a 6 dB decrease in receiver attenuation doubles the attenuated input signal level as measured at the output of the A/D converter 28, for example. On the other hand, a 6 dB increase in receiver attenuation control reduces the measured input signal level in half. Looking at this numerically, in the former case, the digitized signal level may double from 500 to 1,000, for example, resulting in a difference of 500. However in the latter case, the signal level reduces from 500 to 250, yielding a difference of only 250. Both of these values result from the same logarithmic adjustment value in dB's for the receiver attenuation.

The non-linear characteristics of the AGC loop in combination with its 2nd order delay operation provides for a number of undesirable effects. For example, the receiver attenuation adjustment signal 26 has a tendency to overshoot the desired correction for a rapidly increasing received input signal. An illustration of this response is shown in the graph of FIG. 3 in which the received input signaling, depicted by the line 54, increases rapidly by 20 dBs starting from the radar look L0. The computed AGC signal 26, as depicted by the solid line 56 in the graph of FIG. 3, begins responding after two radar looks and appreciably overshoots the desired correction level 58 before eventually converging to the desired level 58 over a longer than desired time interval. Another undesirable effect occurs for a rapidly decreasing received input signal such as that shown by the solid line 60 in FIG. 3, for example, in response to which the AGC signal 26 decays very slowly to the desired lower value 62 as shown by the solid line 64. One stumbling block to alleviating these effects is that the transient performance for a non-linear AGC loop is often very difficult to analyze.

Nonetheless, because of the importance given to increasing the probability of target detection in radars, it is felt necessary to further minimize the response time of the AGC loop to rapidly changing input signals in order to reduce the blind time of the radar. However, at the same time, it is also necessary to maintain the filtering capabilities of the AGC loop so that it does not respond adversely to rapid fluctuations of a noisy input signal.

SUMMARY OF THE INVENTION

A radar having receiver attenuation calibrated logarithmically includes a system for adaptively adjusting the radar receiver attenuation of input signals having a wide dynamic range to maintain the attenuated signals within a predetermined range for radar post processing operations. The system comprises a clutter analyzer for deriving a signal representative of the clutter content of the input signals received over the time interval of a radar look, means for computing a logarithmic signal as a function of the derived signal, the logarithmic signal being compatible with the receiver attenuation calibration, and an automatic gain control (AGC) loop governed by the computed logarithmic signal and a compatible reference logarithmic signal to generate a logarithmic adjustment signal for the receiver attenuation and compatible linearly with the calibration thereof.

In another aspect of the present invention, the AGC loop includes selectable loop gains which are selected as a function of the computed logarithmic signal. More specifically, a selecting means includes means for selecting one set of loop gains for the AGC loop when the computed logarithmic signal is equal to or greater than a threshold value, and for selecting another set of loop gains for the AGC loop when the computed logarithmic signal is less than the threshold level.

In one embodiment, the AGC loop comprises: means for affecting an error signal as the difference between the logarithmic signal and a compatible reference logarithmic signal for each look of a succession of radar looks, means for gain adjusting each error signal with a respectively selected one of first and second loop gains to generate a succession of first signals appropriately delayed from their corresponding succession of radar looks, and means for accumulating the generated first signals of the delayed succession. The accumulating means includes means for adding each first signal to the previous accumulation of first signals gain adjusted with a selected one of third and fourth loop gains. The resulting accumulation of each first signal being the logarithmic adjustment signal for receiver attenuation for the next radar look of the succession of radar looks. The selecting means selects the first and third loop gains when the corresponding error signal is equal to or greater than a threshold level and selects the second and fourth loop gains when the corresponding error signal is less than the threshold level.

Further, the AGC loop may include means for rendering the AGC loop unresponsive to the computed logarithmic signals for a period of time and for causing the accumulator to converge to a desired level during the time period. In one embodiment, this is accomplished by a selecting means which selects the signals for accumulation between the computed logarithmic signals and a fixed logarithmic signal. Still further, the AGC loop may include means for limiting the logarithmic adjustment signal to within a predetermined signal range.

BRIEF DESCRIPTION OF THE DRAWINGS

FIG. 3 is a graph illustrating undesirable receiver attenuation control responsiveness to rapidly increasing and decreasing received input signal strengths.

FIG. 6 is a graph illustrating typical responses in connection with the operation of the embodiment depicted in FIG. 5 to rapidly increasing and decreasing received input signal strengths.

DESCRIPTION OF THE PREFERRED EMBODIMENT

Figure 4A:
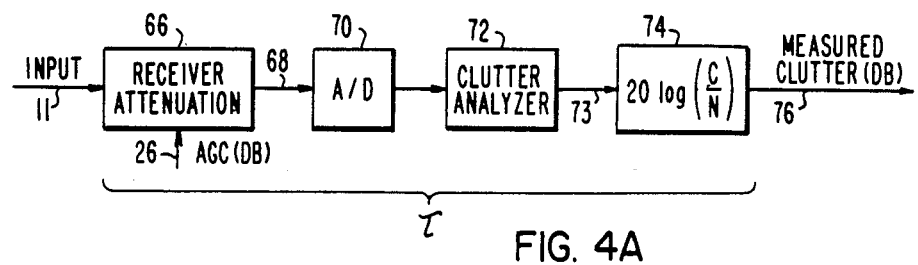
FIGS. 4A and 4B are block diagram schematics suitable for embodying a portion of the receiver attenuation adaptive control in accordance with the present invention.

In the block diagram schematic of FIG. 4A, the receiver attenuation function of the radar is depicted by the block 66. The AGC signal 26 is a logarithmic adjustment signal for the receiver attenuation 66 and compatible linearly with the calibration thereof. The radar input signal 11 is attenuated as governed by the AGC signal 26 yielding the attenuated signal 68 which is digitized by the A/D converter 70 and provided to the clutter analyzer 72 which derives a signal 73 representative of the clutter content of the input signals 11 received over the time interval of a radar look. A computing function 74 is further provided to compute a logarithmic signal 76 as a function of the derived signal 73. The logarithmic signal 76 is compatible, preferably in a linear relationship, with the receiver attenuation calibration. More specifically, the clutter analyzer 72 may derive in a conventional manner a signal representative of the root mean square (RMS) of the clutter content of the input signals 11 which are received over the time interval of a radar look. Moreover, in the preferred embodiment, the computing function 74 is operative in accordance with the following expression:

$$20 \log_{10}(C/N), \tag{1}$$

to compute the logarithmic signal 76, where C is a signal representative of the clutter content of the input signals received over the time interval of a radar look, and N is a predetermined noise signal, whereby the signal (C/N) is representative of the clutter-to-noise ratio of a radar look.

Figure 2:
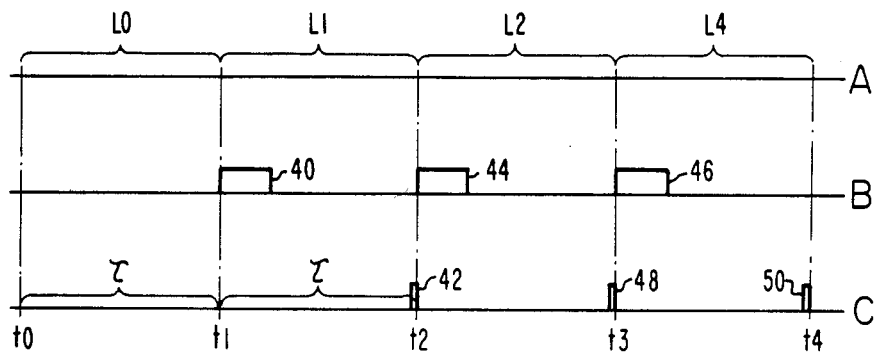
FIG. 2 includes waveforms 2A, 2B, and 2C which exemplify the operation of the control of receiver attenuation according to the embodiment depicted in FIG. 1.
Figure 4B:
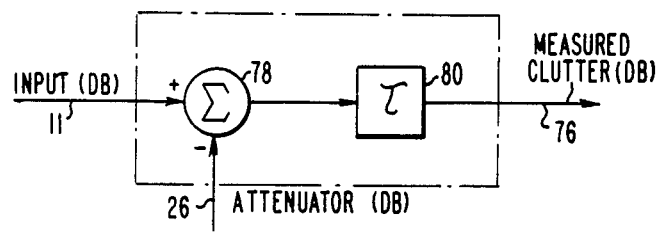

The block diagram schematic of FIG. 4A may be functionally represented by the schematic diagram of FIG. 4B. Referring to FIG. 4B, the summing element 78 represents a composite function of the blocks 66, 70, 72 and 74 of FIG. 4A described hereabove. For example, if the input signaling 11 is measured logarithmically in decibels over a radar look, then the attenuation adustment signal 26 generated in decibels may be subtracted therefrom to yield a logarithmically attenuated signal 76 which is representative of the measured clutter in decibels for a radar look. The time delay block 80 functionally expresses that a computation of the signal 26 is carried out once each radar look which encompasses the time interval depicted by $\tau$ exemplified by the waveforms of FIG. 2.

Figure 1:
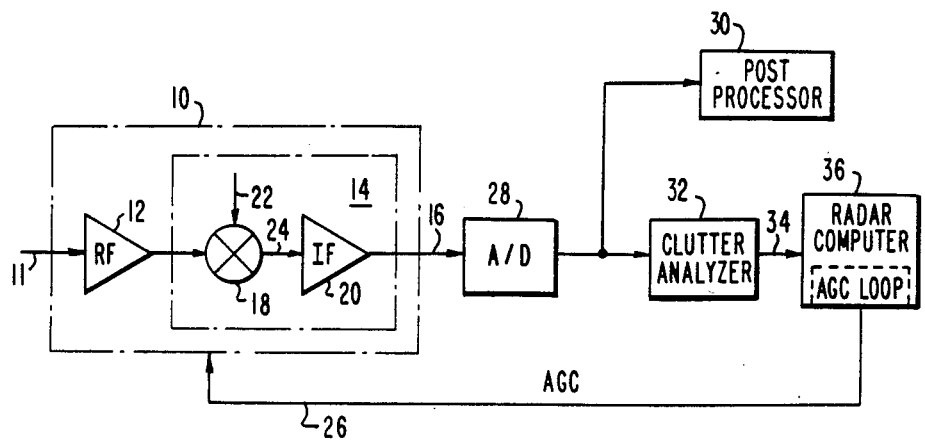
FIG. 1 is a block diagram schematic of a portion of a radar suitable for embodying the present invention.
Figure 5:
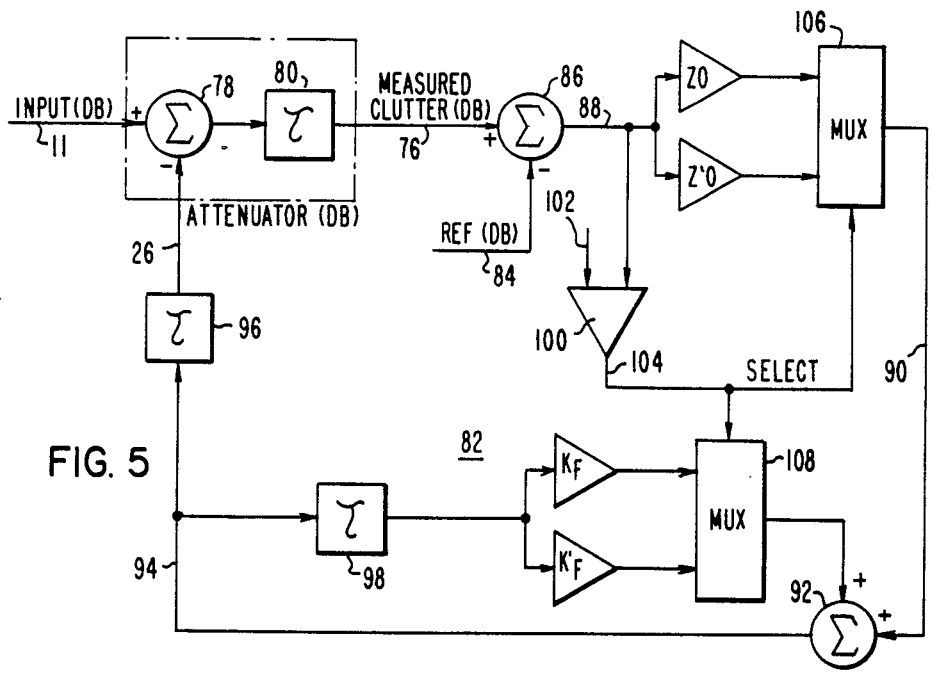
FIG. 5 is a block diagram schematic of an adaptive receiver attenuation control loop suitable for embodying one aspect of the present invention.

In accordance with the present invention, a system for adaptively adjusting the radar receiver attenuation of input signals having a wide dynamic range to maintain the attenuated signals within a predetermined range for radar post processing operations is depicted in the functional block diagram schematic diagram of FIG. 5. The automatic gain control (AGC) loop 82 depicted in FIG. 5 is governed by the computed logarithmic signal 76 and a compatible reference logarithmic signal 84 to generate the logarithmic adjustment signal 26 for the receiver attenuation functionally depicted by the summer 78 and time delay 80. The AGC loop 82 includes selectable loop gains ZO and Z'O as well as $K_F$ and $K'_F$ which may be selected as a function of the computed logarithmic signal 76. In the present embodiment, the functions of the AGC loop 82 are performed in a conventional programmed radar computer (refer to FIG. 1).

More specifically, another summer element 86 may be used to effect an error signal 88 for each look of a succession of radar looks, each error signal 88 being representative of the difference between the logarithmic signal 76 computed for the corresponding radar look and a compatible reference logarithmic signal 84. Generally, the logarithmic reference signal 84 is set closer to the bottom level of the derived logarithmic signal 76 so as to provide for a greater range of positive errors than negative errors at 88. For example, suppose that the range of the measured clutter signal 76 was 0 to 1,000 dB's and that the reference signal 84 was set at 100 dB's. Thus, the error signal would have a positive range of 900 dB's and a negative range of only 100 dB's.

Each error signal 88 may be gain adjusted with a respectively selected loop gain ZO and Z'O to generate a succession of first signals 90 appropriately delayed from their corresponding succession of radar looks. A third summer 92 may be provided for accumulating the generated first signals 90 by adding each first signal 90 to the previous accumulation 94 gain adjusted with a selected one of the loop gains $K_F$ and $K'_F$. The resulting accumulation 94 of each first signal is, for the present embodiment, the logarithmic adjustment signal 26 for receiver attenuation for the next radar look of the succession of radar looks, the delay $\tau$ being functionally denoted by the time delay block 96. The time delay block 98 merely represents the timing operations of the accumulation summer 92 which operates once each radar look as exemplified by the time intervals 40, 44, 46, . . . , in the waveform 2B.

The selecting apparatus of the AGC loop 82, which will be described in greater detail herebelow, selects the gains ZO and $K_F$ when the corresponding error signal 88 is equal to or greater than a threshold value, and selects the loop gains Z'O and $K'_F$ when the corresponding error signal 88 is less than the threshold level. In the present embodiment, the selecting apparatus includes a comparator 100 having as inputs the error signal 88 and a signal 102 representative of the threshold value. The comparator 100 generates a select signal 104 at its output which is coupled to two multiplexer switches 106 and 108 to control the switching operation thereof. The multiplexer switch 106 selects one of the gain adjusted signals ZO or Z'O and the multiplexer switch 108 selects one of the gain adjusted signals $K_F$ or $K'_F$. Accordingly, the outputs of the multiplexer switches 106 and 108 are provided to the summing inputs of the summing element 92. In addition, to provide an appropriate tuning condition of the AGC loop 82, the threshold value of signal 102 may be adjusted to be on the order of 10 dB's less than the reference signal 84.

The Z transfer function for the AGC loop 82 depicted in FIG. 5 may be expressed as follows:

$$\frac{OUT}{IN} = \frac{ZO(Z - K_F)}{Z^2 - ZK_F + ZO}. \quad (2)$$

To provide critical damping for increasing or steady state conditions of the measured clutter signal 76, the loop gains of ZO and $K_F$ may be set at 0.25 and 1, respectively. Similarly, for rapidly decreasing conditions of the measured clutter signal 76, the loop gains of Z'O and $K'_F$ may be selected at 0.23 and 0.96, respectively. Note that the entire operation of the instant AGC loop 82 may be accomplished using the logarithmic units of decibels. Because of the compatibility of the AGC loop 82 with the receiver attenuation calibration, a beneficial linearization of adaptively adjusting the receiver attenuation is effected. In addition, because of the ability to select an appropriate set of loop gains in the AGC loop 82, the AGC reference signal 84 may be varied as desired with insignificant effect on the loop characteristics.

Exemplary testing results of the embodiment described in connection with the block diagram of FIG. 5 are illustrated in the graph of FIG. 6. The same rapid 20 dB increase and decrease examples of change in receiver input signal strength are indicated by the solid lines at 110 and 120, respectively. The response of the AGC loop 82 to these conditions are shown by the solid lines 130 and 140, respectively. Note the improvement in response with respect to the response of the system illustrated in the graph of FIG. 3.

Figure 7:
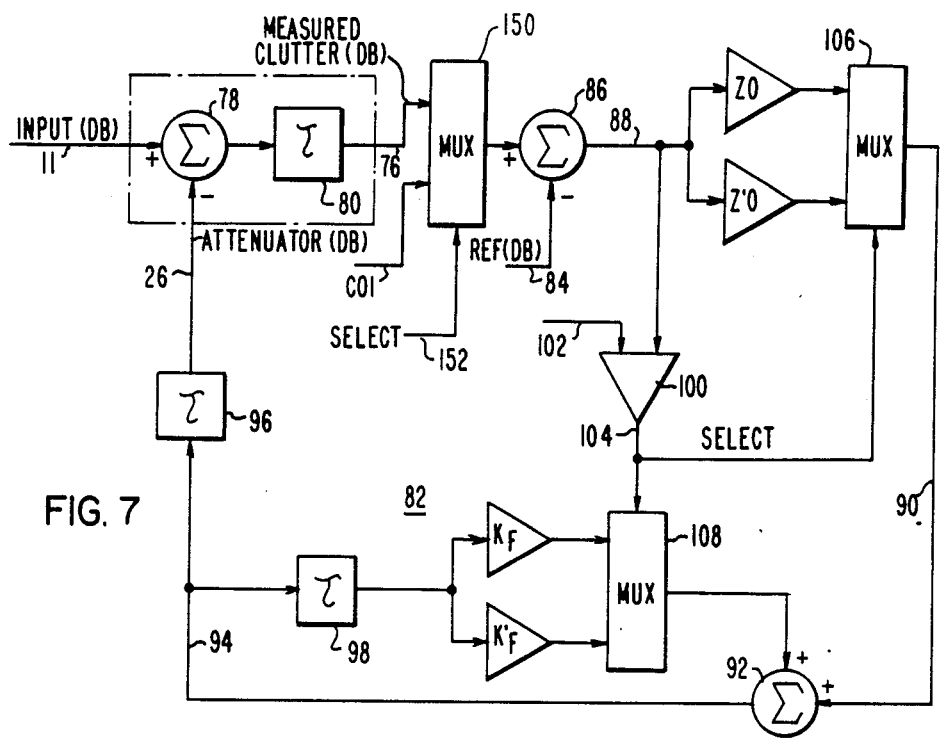
FIG. 7 is a block diagram schematic of an adaptive receiver attenuation control loop suitable for embodying another aspect of the present invention.

Another aspect of the invention deals with conditions during which there is an instantaneous change in observable clutter especially when the radar beam is directed out over the horizon. In response, the measured clutter signaling may change from a very high value to substantially nothing. Because the negative range of the error signal 88 is limited due to the offsetting of the AGC reference signal 84, the accumulator summer 92 may not respond to the instantaneous extreme change in observable clutter as quickly as desired. To accomplish an improved response, apparatus may be included in the AGC loop 82 for rendering the loop 82 unresponsive to the computed logarithimic signal 76 for a period of time and for causing the accumulator 92 to converge to a desired level during the time period of unresponsiveness. For this purpose, another multiplexer switch 150 may be included in the AGC loop embodiment just upstream of the summer 86 as depicted in FIG. 7, wherein the output of the switch 150 is provided to the summer input of 86. The logarithmic signal 76 is provided to one input of the switch 150 and a fixed logarithmic signal CO1 is coupled to the other input thereof. The multiplexer switch 150 may be operated by a select signal 152 to select the signals for accumulation between the computed logarithmic signals 76 and the fixed logarithmic signal CO1, preferably set at 0 dB. In operation, under predetermined conditions, the signal 152 may govern the multiplexer switch 150 to select the fixed logarithmic signal CO1 as the input to the summer 86 which renders the loop 82 unresponsive to the measured clutter signal 76. Should the fixed value CO1 be set at 0 dB, then the error signal 88 is maintained at its maximum negative value. Under these conditions, the accumulator summer 92 is decremented each radar look by the appropriate gain adjusted signal 90 until the output 94 thereof reaches a desired level. When this occurs, the select signal 152 may change state to cause the multiplexer switch 150 to select the measured clutter signal 76 as the input to the summer 86, the operation of which restores the responsiveness of the AGC loop 82.

Figure 8:
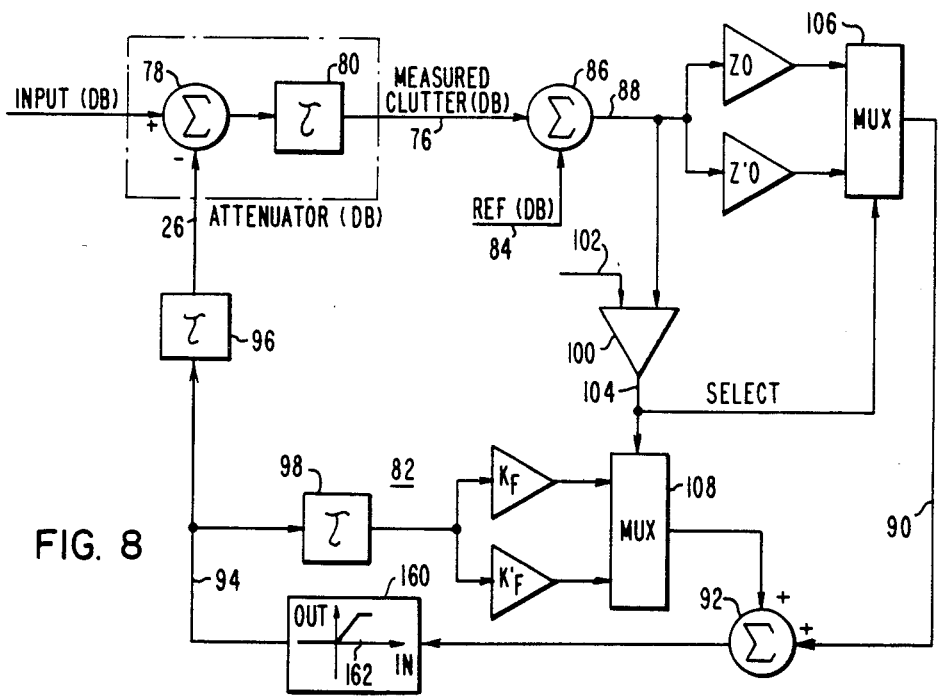
FIG. 8 is a block diagram schematic of an adaptive receiver attenuation control loop suitable for embodying yet another aspect of the present invention.

Another aspect of the present invention includes apparatus 160 which may be added to the AGC loop 82 for limiting the logarithmic adjustment signal 94 to within a predetermined signal range as shown by the embodiment depicted in FIG. 8. In the exemplary embodiment of FIG. 8, when the accumulator output of summer 92 is negative, the limiting function 160 may limit the signal 94 to 0 dB, for example, and similarly, when the summer output exceeds some max positive level 162, the limiter 160 may limit the signal 94 to a max positive value in decibels for all accumulator values greater than the max level 162. One of the reasons for the limiting function 160 is to prevent the accumulator summer 92 from building up large negative and positive signals which have no practical effect on the receiver attenuation because of the fact that the receiver attenuation is not intended to ever become greater than unity or less than some predetermined minimum value. Allowing a large, positive or negative signal to accumulate in the summer 92 will merely result in a longer time delay to remove the unnecessary portion of the accumulation at times when the clutter content of the receiver input signals change. Note that by disposing the limiting function 160 at the output of the summer 92, the feedback signal representative of the previous accumulation value 94 is limited to the predetermined range of the limiter function 160. Thus, the accumulator summer 92 itself will be clamped closely to the upper and lower predefined limits of limiter 160.

While the invention has been described in connection with the embodiments depicted in FIGS. 4A-8, it is understood that modifications and additions may be undertaken with regard to these embodiments without deviating from applicant's invention. Accordingly, applicant's invention should not be limited to any single embodiment, such as that described hereabove, for example, but rather construed in breadth and scope from the recitation of the appended claims.

What is claimed is:

1. In a radar having receiver attenuation calibrated logarithmically, a system for adaptively adjusting the radar receiver attenuation of input signals having a wide dynamic range to maintain said attenuated signals within a predetermined range for radar post processing operations, said system comprising:

means for computing a logarithmic signal as a function of the clutter content of said input signals received over the time interval of a radar look;

an automatic gain control (AGC) loop governed by said computed logarithmic signal and a compatible reference logarithmic signal to generate a logarithmic adjustment signal for said receiver attenuation, said AGC loop comprising:

means for effecting an error signal for each look of a succession of radar looks, each error signal being representative of the difference between the logarithmic signal computed for the corresponding radar look and a compatible reference logarithmic signal;

means for gain adjusting each error signal with a respectively selected one of first and second loop gains to generate a succession of first signals appropriately delayed from their corresponding succession of radar looks; and means for accumulating said generated first signals of said delayed succession, said accumulating means including means for adding each first signal to the previous accumulation of first signals gain adjusted with a selected one of third and fourth loop gains, said resulting accumulation of each first signal being the logarithmic adjustment signal for receiver attenuation for the next radar look of said succession of radar looks; and means for selecting the loop gains of said AGC loop as a function of said computed logarithmic signal.

2. The system in accordance with claim 1 wherein the selecting means includes means for selecting the first and third loop gains when the corresponding error signal is equal to or greater than a threshold level, and for selecting the second and fourth loop gains when the corresponding error signal is less than said threshold level.

3. The system in accordance with claim 1 wherein the receiver attenuation of said radar is calibrated in decibels (dB); and wherein the computing means comprises means operative in accordance with the following expression:

$$20 \log_{10}(C/N),$$

to compute the logarithmic signal, where C is representative of the clutter content of the input signals received over the time interval of a radar look, and N is a predetermined noise signal, whereby the signal (C/N) is representative of the clutter-to-noise ratio of a radar look.

4. The system in accordance with claim 1 wherein the AGC loop includes means for rendering said AGC loop unresponsive to said computed logarithmic signals for a period of time and for causing said accumulating means to converge its resultant accumulation to a desired level during said time period.

5. The system in accordance with claim 1 wherein the AGC loop includes means for selecting said signals for error signal effectuation between the computed logarithmic signals and a fixed logarithmic signal.

6. The system in accordance with claim 1 including means for limiting the logarithmic adjustment signal to within a predetermined signal range.

* * * * *